United States Patent Office 3,547,936
Patented Dec. 15, 1970

3,547,936
PYRIDYL - 2,7 - DIOXABICYCLO[3.2.0$^{1,5}$]HEPT - 3-ENES AND PROCESS FOR PREPARATION
George R. Evanega, Ossining, N.Y., assignor to Union Carbide Corporation, a corporation of New York
No Drawing. Filed Nov. 6, 1967, Ser. No. 680,999
Int. Cl. C07d 31/28
U.S. Cl. 260—297                                    12 Claims

ABSTRACT OF THE DISCLOSURE

Novel oxetanohydrofurans, such as syn-6-phenyl-anti-6-γ-pyridyl-2,7-dioxabicyclo[3.2.0$^{1,5}$]hept-3-ene and syn-6-methyl-anti - 6 - γ - pyridyl-2,7-dioxabicyclo[3.2.0$^{1,5}$]-heptane are prepared by the photochemical addition of carbonyl compounds to furan.

---

This invention relates to novel heterocyclic organic compounds and to a process for their preparation. In one aspect, this invention is directed to novel oxetanohydrofurans. In a further aspect, this invention relates to novel oxetanohydrofurans which are useful in agricultural applications.

Heretofore, a wide variety of synthetic methods have been reported in the literature for the preparation of oxetanes. However, most of these methods are not very general and frequently require the use of starting materials which are exceedingly difficult to prepare. Moreover, the reported synthetic methods rarely give high yields and hence are undesirable for large scale commercial production.

It has recently been discovered that a wide variety of novel oxetanes can be prepared by the photocyclo-addition of carbonyl compounds to olefins. In many instances, the yield of desired oxetanes are high, sometimes nearly quantitative. Moreover, the starting materials are readily available and hence oxetanes can readily be obtained which were difficult or impossible to prepare by classical methods.

Accordingly, one or more of the following objects will be achieved by the practice of this invention. It is an object of this invention to provide a class of novel oxetanohydrofurans. Another object of this invention is to provide a class of oxetanohydrofurans which are useful in agricultural applications. A further object of this invention is to provide novel oxetanodihydrofurans. A still further object is to provide novel oxetanotetrahydrofurans. Another object is to provide a process for the preparation of the compositions of this invention. These and other objects will readily become apparent to those skilled in the art in the light of the teachings herein set forth.

The novel oxetanohydrofurans of this invention can be represented by the following formula:

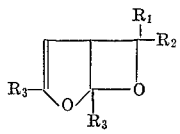

wherein R$_1$ represents hydrogen, hydrocarbyl, halohydrocarbyl, alkoxyhydrocarbyl, cyano, carboxamido, halocarbonyl, N-alkylcarboxamido, N,N-dialkylcarboxamido, pyridyl, alkylpyridyl, N-alkylpyridyl, N-aralkylpyridyl, and N-oxypyridyl, said hydrocarbyl groups being free from aliphatic unsaturation and polynuclear aromatic groups; R$_2$ represents pyridyl, alkylpyridyl, N-alkylpyridyl, N-aralkylpyridyl and N-oxypyridyl, and R$_3$ represents hydrogen, alkyl, haloalkyl, alkoxyhydrocarbyl, aminohydrocarbyl, N-alkylaminohydrocarbyl, N,N-dialkylaminohydrocarbyl, and aminoalkoxyhydrocarbyl.

Preferred novel oxetanohydrofurans encompassed by the aforementioned formula are those wherein R$_1$ represents hydrogen, alkyl, aryl, alkaryl, aralkyl, cycloalkyl, bicycloalkyl, haloalkyl, e.g., chloromethyl, trifluoromethyl, etc., haloaryl, haloalkaryl, halocarbonyl, alkoxyaryl, cyano, carboxamido, and N-alkylcarboxamido; N,N-dialkylcarboxamido, R$_2$ represents pyridyl (2, 3 or 4), alkylpyridyl, N-alkylpyridyl, N-aralkylpyridyl, N-oxypyridyl, and R$_3$ represents hydrogen, lower alkyl, aminoalkyl, aminoaryl, aminoaralkyl, aminoalkaryl, N-alkylaminoalkyl, N,N-dialkylaminoalkyl, aminoalkoxyalkyl, N-alkylaminoalkoxyalkyl, N,N - dialkylaminoalkoxyalkyl, and haloalkyl, e.g., chloroethyl, trifluoromethyl, and the like.

Particularly preferred oxetanohydrofurans are those wherein R$_1$ and R$_2$ individually contain up to 12 carbon atoms, and R$_3$ contains up to 8 carbon atoms.

Illustrative novel oxetanohydrofurans of this invention include, among others, syn-6-phenyl-anti-6-γ-pyridyl-2,7-dioxabicyclo[3.2.0$^{1,5}$] hept-3-ene,
syn-6-γ-pyridyl-anti-6-phenyl-2,7-dioxabicyclo[3.2.0$^{1,5}$] hept-3-ene,
syn-6-phenyl-anti-6-α-pyridyl-2,7-dioxabicyclo[3.2.0$^{1,5}$] hept-3-ene,
syn-6-phenyl-anti-6-β-pyridyl-2,7-dioxabicyclo[3.2.0$^{1,5}$] hept-3-ene,
syn-6-β-pyridyl-anti-6-phenyl-2,7-dioxabicyclo[3.2.0$^{1,5}$] hept-3-ene,
syn-6-methyl-anti-6-γ-pyridyl-2,7-dioxabicyclo[3.2.0$^{1,5}$] hept-3-ene,
syn-6-methyl-anti-6-β-pyridyl-2,7-dioxabicyclo[3.2.0$^{1,5}$] hept-3-ene,
syn-6-methyl-anti-6-α-pyridyl-2,7-dioxabicyclo[3.2.0$^{1,5}$] hept-3-ene,
anti-6-γ-pyridyl-2,7-dioxabicyclo[3.2.0$^{1,5}$]hept-3-ene,
anti-6-β-pyridyl-2,7-dioxabicyclo[3.2.0$^{1,5}$]hept-3-ene,
syn-6-methyl-anti-6-N-oxy-γ-pyridyl-2,7-dioxabicyclo- [3.2.0$^{1,5}$]hept-3-ene,
syn-6-methyl-anti-6-N-oxy-β-pyridyl-2,7-dioxabicyclo- [3.2.0$^{1,5}$]hept-3-ene,
syn-6-phenyl-anti-6-N-oxy-α-pyridyl-2,7-dioxabicyclo- [3.2.0$^{1,5}$]hept-3-ene,
syn-6-methyl-anti-6-N-methylpyridyl-2,7-dioxabicyclo- [3.2.0$^{1,5}$]hept-3-ene,
1,3-di(chloromethyl)-syn-6-methyl-anti-6-γ-pyridyl-2,7-dioxabicyclo[3.2.0$^{1,5}$]hept-3-ene,
1,3-di(N-methylaminomethyl)-syn-6-methyl-anti-6-γ-pyridyl-2,7-dioxabicyclo[3.2.0$^{1,5}$]hept-3-ene,
syn-6-p-chlorophenyl-anti-6-α-pyridyl-2,7-dioxabicyclo- [3.2.0$^{1,5}$]hept-3-ene,
6,6-di(γ-pyridyl)-2,7-dioxabicyclo[3.2.0$^{1,5}$]hept-3-ene,
and the like.

It will be readily appreciated that a wide variety of isomeric oxetanohydrofurans are encompassed by the instant invention. For example when R$_1$ and R$_2$ are different, two geometric isomers can be obtained for the same product:

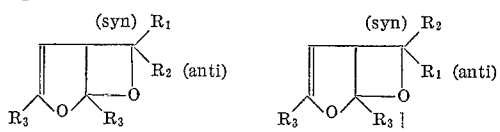

This is, of course, in addition to the usual isomeric forms possible when the R$_2$ group is itself heterocyclic and can be attached to the oxetane ring carbon atom in more than one position, for example, α-, β- and γ-pyridyl. Similarly, when R$_3$ of the general formula is other than hydrogen, isomeric products will also be obtained. It should be noted, however, that in the case wherein one of the R$_1$ or $R_2$ variables is hydrogen or lower alkyl, that particular R will always be in the syn position.

The novel oxetanohydrofurans of this invention can be produced by the photocatalyzed reaction of a ketone or aldehyde with furan or various substituted furans.

The reaction producing the novel compositions of this invention is carried out by bringing the ketone or aldehyde and the furan compound into admixture in a suitable reactor and irradiating the mixture with light energy of catalytic wavelength, typically in the range of from about 2,000 to about 4,000 angstroms and more preferably from about 3,000 to about 4,000 angstroms. The use of light energy of shorter wavelengths substantially below 2,000 angstroms may engender the photolytic decomposition of the reactants and/or the product and is therefore to be avoided, while little if any of the desired reaction occurs using light energy of longer wavelengths substantially above 4,000 angstroms. Thus, the term "light energy," as employed herein, contemplates wavelengths predominantly in the ultraviolet spectrum. Convenient sources of such light energy includes, for instance, tungsten bulbs, daylight, mercury vapor, black light fluorescent lamps, and germicidal fluorescent lamps, xenon arc lamps, and the like.

The reaction of the ketone or aldehyde with the furan compound can be carried out in solution using an inert, normally liquid solvent such as a saturated aliphatic or aromatic hydrocarbon or halogen derivative thereof, as for instance, heptane, hexane, pentane, benzene, acetic acid, acetonitrile, carbon tetrachloride, pyridine, and the like, especially those having a boiling point below about 100° C. The use of such a solvent is preferred. The reaction can, however, also be carried out "neat," i.e., in the absence of external solvent.

The proportion in which the reactants are utilized can vary broadly, and does not limit the invention. Typically, the reactants are employed in a proportion of from about 0.1 mole to about 10 moles of the ketone or aldehyde per mole of the furan compound. Higher or lower proportions of reactants can also be employed satisfactorily. However, the efficient utilization of aldehyde or ketone will increase when the furan is used as the solvent.

The reaction temperature can also vary broadly, typically in the range of from about 0° C. to about the boiling point of furan at the particular pressure chosen. Here again, higher or lower reaction temperatures may also be employed satisfactorily. In any given instance, however, the temperature should not be so high as to engender the decomposition of the relatively heat-sensitive oxetanohydrofuran product, and is dependent to a large extent upon the identity of any external solvent employed. Thus, the temperature should not be so high as to volatilize the solvent, nor so low as to preclude its normally liquid form. Preferably, the temperature should also be consistent with the dissolution of any gaseous reactant in the solvent, i.e., should not volatilize the reactant from the solvent.

When within the above temperature range, the reaction is generally carried out, i.e., irradiation continued, for a period of from several hours to several days depending upon the concentration of reactants present, the wavelength and intensity of the light energy employed, the quantum yield of the reaction, etc. Longer or shorter reaction periods sufficient to produce the desired product can also be utilized. Preferably, a stoichiometric amount or excess of the furan compound is admixed with the ketone or aldehyde and the reaction is carried out to completion as determined by periodically removing aliquots from the reaction mixture and subjecting the aliquots to infra-red analysis and thin-layer and gas-liquid phase chromatographic analyses. Under such circumstances the completion of the reaction is indicated by the disappearance of the carbonyl peak in the infra-red spectrum, carbonyl absorption occurring at a wavelength of approximately 6 microns.

Any suitable vessel which will permit the transmission of light energy of the desired wavelength, as described above, can be employed as a reactor. Typically, Pyrex or quartz vessels are employed in this regard, Pyrex being preferred interposed between the reaction mixture and the source of light energy.

Upon completion of the reaction the product which is ordinarily a colorless solid and crystalline in form can be recovered in any convenient manner. For instance, the product can be recovered as the residue obtained upon the evaporation or distillation of any unreacted material and/ or solvent present. The product can thereafter be purified, if desired, by extraction or recrystallization, etc.

The apparatus employed in the preparation of the oxetanohydrofurans consisted of a Pyrex well immersed in a Pyrex reaction vessel having a capacity of 250 milliliters. The reaction vessel was equipped at the bottom with a glass fitted gas inlet for the introduction of purge gas and gaseous reaction, and the top with two outlets, one protected by a solvent trap and the other covered by a rubber septum through which periodic withdrawal of aliquots of the reaction mixture could be made. The light source was a 450 watt (Hanovia No. 679A-36) mercury arc lamp.

Unless otherwise indicated, all of the oxetanahydrofuran products described herein were prepared by essentially the same procedure using the appropriate ketone or aldehyde and furan compound as reactants, as indicated in the examples. In each instance, the structure of the product was confirmed by infrared analysis, oxetane absorption occurring at a wavelength of $10\pm0.4$ microns, and nuclear magnetic resonance.

In a second embodiment of this invention, the compositions of the aforementioned formula can be reduced to provide saturated oxetanohydrofurans of the formula:

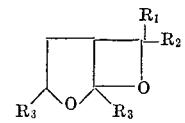

wherein $R_1$, $R_2$, and $R_3$ have the same value as previously indicated. These compositions are prepared, as indicated in the examples, by reducing the corresponding oxetanodihydrofurans.

Illustrative oxetanotetrahydrofurans include, among others, syn-6-methyl-anti-6-α-pyridiyl-2,7-dioxabicyclo[3.2.0$^{1,5}$] heptane,
syn-6-phenyl-anti-N-oxy-γ-pyridyl-2,7-dioxabicyclo [3.2.0$^{1,5}$]heptane,
syn-6-methyl-anti-6-γ-pyridyl-2,7-dioxabicyclo[3.2.0$^{1,5}$] heptane,
syn-6-phenyl-anti-6-γ-pyridyl-2,7-dioxabicyclo[3.2.0$^{1,5}$] heptane, and the like.

Reduction of the oxetanodihydrofurans to the corresponding oxetanotetrahydrofurans is conveniently effected by hydrogenation in the presence of a suitable catalyst. Illustrative catalysts include platinum, platinum oxide, Raney nickel, and the like. Temperature and pressure are not necessarily critical and can vary depending upon the particular system employed.

Preparation of the 6-N-oxy-pyridyl derivatives is effected by oxidation of the corresponding 6-N-pyridyl compound as indicated in Example X.

In the examples the oxetanodihydrofurans were synthesized photochemically from the corresponding ketone or aldehyde and furan in accordance with the following procedure. A magnetically stirred solution of 0.1 mole ketone or aldehyde in 250 cc. furan was purged with nitrogen for 30 minutes and irradiated with a 450 watt Hanovia Hg HP immersion lamp (Pyrex filter) until the infrared carbonyl stretch disappeared or decreased markedly. 3-acetyl pyridine and the pyridine aldehydes were especially prone to polymer or tar formation on the immersion well.

Thus it was necessary to stop the irradiation daily, clean the immersion well and repurge with nitrogen before irradiating. The products were isolated and identified by IR (by the presence of vinyl CH stretch, which disappeared on hydrogenation of the double bond, and the oxetane C—O stretch and by the absence of C=O stretch and O—H stretch), by NMR spectra and by elemental analyses.

EXAMPLE I

Syn - 6 - phenyl - anti - 6 - γ - pyridyl - 2,7 - dioxabicyclo[3.2.0$^{1,5}$]hept - 3 - ene (I$a$) and anti - 6 - phenyl-syn - 6 - γ - pyridyl - 2,7 - dioxabicyclo[3.2.0$^{1,5}$]hept-3-ene (I$b$)

In accordance with the above procedure, furan and 4-benzoylpyridine were irradiated for a period of 43 hours, after which the solution was concentrated in vacuum to give a red brown paste. The paste was swirled with ether and filtered to give 9.85 grams (39 percent yield) of (I$a$) a pink solid havng a melting point of 154°–156° C. Upon recrystallization from benzene-hexane there were obtained colorless needles having a melting point of 159°–160° C., and the following analysis:

Calculated for $C_{16}H_{13}NO_2$ (percent): C, 76.47; H, 5.22; N, 5.57. Found (percent): C, 76.25; H, 5.12; N, 5.54.

IR/KBr $\gamma_{max}$ 950–1050 cm.$^{-1}$(s) (oxetane C—O stretch), 3100 cm.$^{-1}$(w) (vinyl C—H stretch). The ether wash was concentrated to give 14.8 g. of a red-brown oil. This was dissolved in dry ether and a 2 N HCl ether solution was added in small portions with stirring; five fractions were collected, each was filtered, neutralized immediately with 10% NaHCO$_3$ solution, extracted with ether and the ether dried with MgSO$_4$ and concentrated. Fractions 3 and 4 crystallized immediately to give 5.75 grams of (I$b$). Recrystallization from hexane gave a product having a M.P. of 104–5° C., a 23% yield and the following analysis:

Calculated for $C_{16}H_{13}NO_2$ (percent): C, 76.47; H, 5.22; N, 5.57. Found (percent): C, 76.64; H, 5.08; N, 5.76.

The IR/KBr of (I$b$) was distinctly different from (I$a$); IR/KBr 950–1050 cm.$^{-1}$(s) and 3100 cm.$^{-1}$(w). Fractions 1, 2 and 5 were oily residues that contained carbonyl material (IR, C=O stretch). The NMR of the crude irradiation mixture upon addition of cobalt (II) acetylacetonate indicated that (I$a$ and (I$b$) were present in a 50:50 ratio.

EXAMPLE II

Syn - 6 - phenyl - anti - 6 - β - pyridyl - 2,7 - dioxabicyclo[3.2.0$^{1,5}$]hept - 3 - ene (I$c$) and syn - 6 - β-pyridyl-anti - 6 - phenyl - 2,7 - dioxabicyclo[3.2.0$^{1,5}$]hept-3-ene (I$d$)

In a manner similar to that employed in Example I furan and 3-benzoylpyridine were irradiated for a period of 72 hours and the solution then concentrated to give 24.6 grams of a brown oil. The NMR of the crude oil in CdCl$_3$ with cobalt (II) acetylacetonate indicated a 50:50 mixture of (I$c$) and (I$d$). The brown oil was extracted several times with hot hexane to give 21.2 grams of a yellow solid. Five recrystallizations of this material from hexane gave 3.9 g. of (I$d$), having a melting point of 106–108° C. (greater than 95% one isomer by NMR);

Calculated for $C_{16}H_{13}NO_2$ (percent): C, 76.47; H, 5.22; N, 5.57. Found (percent): C, 76.37; H, 5.34; N, 5.45.

IR/KBr $\nu_{max}$ 940 cm.$^{-1}$(s), 960 cm.$^{-1}$(s) and 3100 cm.$^{-1}$(w). The mother liquors of the above were combined, and concentrated to give 16.3 g. of a yellow solid. This was dissolved in ether, filtered and an ethereal solution of HCl added. The first portion of the precipitate was filtered, washed with ether, and dried in vacuum. It was then dissolved in hot acetone, filtered to remove some insoluble material, allowed to stand in the refrigerator in order to obtain 3.1 grams of the hydrochloride. The needles were neutralized with 10% NaOH solution and the free base was extracted with CH$_2$Cl$_2$, the solution dried with MgSO$_4$ and concentrated to give 2.9 grams of (I$c$). Recrystallization from ether gave a solvent having a melting point of 125–6° C. NMR indicates only one isomer.

Calculated for $C_{16}H_{13}NO_2$ (percent): C, 76.47; H, 5.22; N, 5.57. Found (percent): C, 76.65; H, 5.13; N, 5.47.

IR/KBr $\nu_{max}$ 925 cm.$^{-1}$(s), 950 cm.$^{-1}$(s), 960 cm.$^{-1}$(s) and 3100 cm.$^{-1}$(w). The IR spectrum of (I$c$) and (I$d$) were distinctly different.

EXAMPLE III

Syn-6-methyl-anti-6-γ-pyridyl-2,7-dioxabicyclo[3.2.0$^{1,5}$]hept-3-ene (I$e$)

In a manner similar to that employed in Example I 4-acetylpyridine and furan were irradiated for a period of 60 hours and the solution was concentrated to give a brown oil. This was extracted with hot hexane several times and the extract was cooled to give 13.68 grams of light yellow needles (I$e$) having a melting point of 71–2° C. This represented a 72 percent yield. Sublimation and recrystallization gave colorless needles having a melting point of M.P. 73–4° C. IR/KBr$_{max}$ 3095 cm.$^{-1}$(w) (vinyl C—H stretch), 960 cm.$^{-1}$(s) (oxetane C—O stretch).

Calculated for $C_{11}H_{11}NO_2$ (percent): C, 69.82; H, 5.86; N, 7.40. Found (percent): C, 69.67; H, 5.81; N, 7.46.

The NMR of the crude irradiation mixture was almost identical with the NMR of (I$e$), and there is less than 5% of the other isomer.

EXAMPLE IV

Syn-6-methyl-anti-6-β-pyridyl-2,7-dioxabicyclo[3.2.0$^{1,5}$]hept-3-ene (I$f$)

3-acetylpyridine and furan were irradiated in the same manner as employed above. The irradiation was stopped after 7 days since even though the neat IR of the C=O stretch of 3-acetylpyridine had diminished, no further change occurred over the last 24 hours. After concentration to a dark brown oil, extraction with hexane gave 14.35 grams of a light yellow oil that contained a significant amount of 3-acetylpyridine (neat IR). This oil was dissolved in hot hexane and allowed to stand overnight at room temperature; 4.78 grams, 25% yield, of colorless prisms (I$f$), melting point 47–8° C. was obtained; KR/KBr$_{max}$ 3090 cm.$^{-1}$(w) (vinyl C—H stretch) and 940 cm.$^{-1}$(s) (oxetane C—O stretch).

Calculated for $C_{11}H_{11}NO_2$ (percent): C, 69.82; H, 5.86; N, 7.40. Found (percent): C, 69.68; H, 5.86; N, 7.46.

The NMR of the light yellow oil (14.35 g.) indicated the presence of (I$f$) in an approximate 64% overall yield along with 3-acetylpyridine.

EXAMPLE V

Anti-6-γ-pyridyl-2,7-dioxabicyclo[3.2.0$^{1,5}$]hept-3-ene (I$g$)

After 2 weeks of irradiation of a mixture of 4-pyridyl aldehyde and furan, during which time the solution was purged with N$_2$ continuously, the irradiation mixture was concentrated to a brown liquid and then distilled through a Vigreux column under a high vacuum. The fraction which distilled at 110° C. (5$\mu$) was dissolved in 20 ml. CH$_2$Cl$_2$ and extracted with 25 ml. standard bisulfite solution. The CH$_2$Cl$_2$ layer was dried over MgSO$_4$, concentrated to an orange oily solid (8.2 g.), sublimed (52° C. and 10$\mu$), and the yellow sublimate recrystallized from ether at −70° C., there was obtained 4.8 grams (27% yield) of colorless solid (I$g$) having a melting point of 54.0–55.5° C.

Calculated for $C_{10}H_9NO_2$ (percent): C, 68.56; H, 5.18; N, 8.00; O, 18.27. Found (percent): C, 68.54; H, 5.29; N, 7.93; O, 18.22.

IR neat, 934 cm.$^{-1}$(s) (oxetane C—O stretch) 3092 cm.$^{-1}$(w) (vinyl C—H stretch).

EXAMPLE VI

Anti-6-β-pyridyl-2,7-dioxabicyclo[3.2.0$^{1,5}$] hept-3-ene (Ih)

After 3 weeks of irradiation of a mixture of 3-pyridyl aldehyde and furan, during which time the solution was purged with $N_2$ continuously, the solution was concentrated to a brown oil which was dissolved in $CH_2Cl_2$, extracted with bisulfite solution, dried and concentrated to give 3.50 grams of an orange oil. The oil was evaporatively distilled at 110° C. (10μ) to yield 2.22 grams (13% yield) of a colorless oil (Ih).

Calculated for $C_{10}H_9NO_2$ (percent): C, 68.56; H, 5.18; N, 8.00; O, 18.27. Found (percent): C, 68.69; H, 5.23; N, 7.77; O, 18.23.

IR neat, 939 cm.$^{-1}$(s) (oxetane C—O stretch) and 3095 cm.$^{-1}$(w) (vinyl C—H stretch).

EXAMPLE VII

Syn-6-methyl-anti-6-(α-pyridyl)-2,7-dioxabicyclo[3.2.0$^{1,5}$]hept-3-ene (Ii)

A solution of 12.1 g. (.10 mole) 2-acetylpyridine in 250 mls. furan was purged with nitrogen for ½ hour and then irradiated for 60 hours using a Hanovia #679A–36 mercury vapor lamp. The immersion well was cleaned every two days to remove the brown polymeric material which formed during the irradiation. The irradiation mixture was concentrated to a brown oil which was extracted with hexane. The hexane solution was concentrated to a pale yellow oil which crystallized very slowly on standing. The solid was sublimed at room temperature (50μ) to give 2.02 grams (.011 moles), 11% yield of (Ii) which melted from 54.5–55.2° C.

Calculated for $C_{11}H_{11}NO_2$ (percent): C, 69.82; H, 5.86; N, 7.40. Found (percent): C, 69.49; H, 5.96; N, 7.34.

IR data, C—O oxetane centered at 10.46μ, 956 cm.$^{-1}$; C=C 1601 cm.$^{-1}$.

EXAMPLE VIII

Syn-6-methyl-anti-6-α-pyridyl-2,7-dioxabicyclo[3.2.1$^{1,5}$]heptane (Ij)

A solution of 1.5 grams (.0079 mole) of the product of Example VII in 100 mls. EtOH was hydrogenated over 20 mg. $PtO_2$ for 1 hour at room temperature and 15 pounds pressure in a Parr shaker. The filtered solution was concentrated to a yellow oil which crystallized after being scratched and allowed to stand at room temperature. This solid was sublimed at room temperature to 0.31 gram (.0016 mole, 20%) (Ij) which melted from 40.5–41.5° C.

Calculated for $C_{11}H_{13}NO_2$ (percent): C, 69.09; H, 6.85; N, 7.33. Found (percent): C, 68.92; H, 6.90; N, 7.23.

IR C—O oxetane 10.55, 948 cm.$^{-1}$.

EXAMPLE IX

Syn-6-phenyl-anti-6-(N-oxy-γ-pyridyl)-2,7-dioxabicyclo[3.2.0$^{1,5}$]heptane (Ik)

12.0 grams (.0472 moles) 2,7-dioxa-6-(γ-pyridyl)-6-phenyl bicyclo[3.2.0$^{1,5}$]heptane and 16.0 g. (.094 mole) m-chloro perbenzoic acid were dissolved in 250 mls. $CH_2Cl_2$ at room temperature. The concentration of active oxygen remaining was checked periodically by titration with 0.1 N $Na_2S_2O_3$. After one hour, one equivalent had been consumed. The reaction mixture was then neutralized and extracted with 3×200 mls. portions of 10% NaOH. The NaOH layer was extracted with 200 mls. $CH_2Cl_2$. The $CH_2Cl_2$ layers were combined, dried over $MgSO_4$ and concentrated to a pale beige solid (12.9 grams) which were recrystallized from 185 mls. 20% hexane in benzene to give 7.15 grams (.266 moles, 56%) of (Ik) having a melting point of 161.5–162.5° C.

Calculated for $C_{16}H_{15}O_3N$ (percent): C, 71.36; H, 5.61; O, 17.82; N, 5.20. Found (percent): C, 71.37; 71.06; H, 5.73; 5.74; O, 17.87; 17.92; N, 4.90, 4.71.

IR data; N—O, 8.04μ, 1244 cm.$^{-1}$, C—O oxetane 10.60μ, 943 cm.$^{-1}$.

EXAMPLE X

Syn-6-methyl-anti-6-(N-oxy-γ-pyridyl-2,7-dioxabicyclo-[3.2.0$^{1,5}$]hept-3-ene (Il)

10.0 grams (.0529 moles) 6-methyl-6-α-pyridyl-2,7-dioxabicyclo[3.2.0$^{1,5}$]hept - 3 - ene and 9.13 g. (0.529 mole) m-chloro perbenzoic acid were dissolved in 450 mls. $CH_2Cl_2$ at room temperature. Samples of the reaction mixture were taken at various times and checked for presence of active oxygen. After 17 minutes 95% of the active oxygen had been consumed. The reaction was stopped at 19 minutes by extraction with 3×250 mls. 10% NaOH. The NaOH layer was extracted with $CH_2Cl_2$. The $CH_2Cl_2$ layers were combined, dried over $MgSO_4$, concentrated to give 7.8 g. of a gummy beige solid which was recrystallized from 175 mls. of 10% hexane in benzene to give 4.4 g. orange solid. This was sublimed at 88° C. at 5μ pressure to give after 1½ days 0.95 g. white solid (Il) having a melting point of 149.0–150.5° C. The nonsublimed part of the 4.4 g. which had turned brown was dissolved in $MeCl_2$, re-extracted with 10% NaOH, dried over $MgSO_4$ and concentrated to give 1.22 g. white solid, (Il) (M.P. 148–150° C.). The total yield was 2.17 grams (.0106 moles, 20%) of (Il).

Calcd. for $C_{11}H_{11}NO_3$ (percent): C, 64.38; H, 5.40; N, 6.83; O, 23.39. Found (percent): C, 64.63, 64.57; H, 5.46, 5.41; N, 6.99, 6.97; O, 22.94, 23.05.

IR data: C—O oxetane 949 cm.$^{-1}$, 10.54μ; C=C 1598 cm.$^{-1}$, 6.26μ.

The novel oxetanohydrofurans of this invention may be employed in a variety of commercial areas, among which is their use in agracultural applications. The 6-phenyl-6-pyridyl - 2,7 - dioxabicyclo[3.2.0$^{1,5}$]hept-3-enes are particularly useful in this regard. These compositions demonstrate a high degree of mildewcidal activity at low concentrations.

It has been found that the novel oxetanohydrofurans of this invention are especially effective against *Erysiphe polygoni*, the casual organism of powdery mildew of bean. Significantly, when applied to a mildew susceptible host in a suitable inert carrier, the oxetanohydrofurans, and particularly the 6-phenyl-6-pyridyl-substituted oxetanohydrofurans, demonstrate mildewcidal activity at concentrations as low as 0.1 part per million parts of carrier, or even at somewhat lower concentrations. Moreover, the oxetanes demonstrate good retention of mildewcidal activity for appreciable periods of time following their formation.

Typically, the oxetanohydrofurans are employed as mildewcides in a concentration in the range of from about 4 to about 500 parts per million parts of carrier, although higher or lower mildewcidally effective amounts can also be employed. A preferred range is from about 20 to about 100 parts per million parts of carrier. Any suitable inert liquid or solid carrier such as water, talc, or the like, can be employed in this regard, as can readily be determined by one skilled in the art in the light of this disclosure.

The procedure employed in evaluating the novel compositions of this invention is as follows:

Biological test procedures

A stock suspension of the oxetanohydrofuran was prepared by dissolving one gram in 50 milliliters of acetone in which had been dissolved 0.1 gram of octylphenoxy polyethoxyethanol as an emulsifying agent. The resulting solution was mixed into 150 milliliters of water to give 200 milliliters of a suspension containing the oxetane in finely divided form. The various test concentrations described in parts per million were prepared by dilution of this stock solution.

Tender green beans were used as the host plant for the bean mildew, *Erysiphe polygoni*. A culture of this organism was maintained on bean plants in a greenhouse. Twenty-four hours prior to testing, uninfected plants with primary leaves fully expanded were inoculated by brushing their leaves lightly with plants taken from the stock culture.

The bean plants infected with mildew were sprayed on a revolving turntable for 30 seconds at a pressure of 40 p.s.i.g. Approximately 100 milliliters of spray were delivered. For control purposes, an equal volume of a water solution containing acetone emulsifier, and a conventional mildewcide, Karathane[1], in the same concentrations as the stock suspension above was also sprayed on other infected plants.

After the spray had dried, the plants were held in a greenhouse for a period of 7–10 days. At the end of this period, visual observations of mildew control were made according to the following designations:

5 = 100% control, no spots per leaf
4 = 1–3 spots per leaf
3 = 4–10 spots per leaf
2 = Many but distinctly different spots
1 = Leaf overrun with mildew; equal to check plants.

The results obtained using 6-phenyl-6-γ-pyridyl-2,7-dioxabicyclo[3.2.0$^{1,5}$]hept-3-ene and 6-phenyl-6-α-pyridyl-2,7-dioxabicyclo[3.2.0$^{1,5}$]hept-3-ene as mildewcides are tabulated below in Table A. The effectiveness rating is that made in accordance with the visual observations described above.

Table A

Mildewcide: Effectiveness rating
6-phenyl-6-γ-pyridyl-2,7-dioxabicyclo-
 [3.2.0$^{1,5}$]hept-3-ene _____ 5
6-phenyl-6-α-pyridyl-2,7-dioxabicyclo-
 [3.2.0$^{1,5}$]hept-3-ene _____ 5
Karathane _____ 5

The foregoing results clearly demonstrate the effectiveness of the oxetanohydrofurans as compared with the use of the conventional mildewcide.

In addition to contacting the causative organism, mildew control is also realized by the application of the oxetanohydrofurans of this invention in similar manner to an uninfected mildew susceptible host. Protection against the onset of mildew is thereby realized for appreciable periods of time during which the compositions are active as mildewcides.

Moreover, it has been found from screening tests that the oxetanohydrofurans of this invention, particularly the 6-phenyl-6-pyridyl-substituted oxetanohydrofurans, are effective in other fungicidal applications. By way of illustration, the oxetanohydrofuran of Example I has also demonstrated activity as a soil fungicide, Pythium sp. being the causative organism in this instance.

It has also been observed that the oxetanohydrofurans of this invention are also useful in the control of crabgrass (*Digitaria sanguinalis*). When the oxetanes were applied to soil in which the seeds were sown, at a concentration equivalent to 8 pounds per acre they exhibited pre-emergence herbicidal activity. For instance, 6-phenyl-6-γ-pyridyl-2,7-dioxabicyclo[3.20.0$^{3,5}$]hept-3-ene and 6-phenyl-6-β-pyridyl-2,7-dioxabicyclo[3.2.0$^{1,5}$]-hept-3-ene when sprayed on soil containing crabgrass seeds resulted in the emergence of few seedlings as compared with the control where no injury to the seedlings appeared.

In addition to their use in agricultural applications, the novel oxetanohydrofurans of this invention are useful in other areas of application. The saturated oxetanotetrahydrofurans and the 6-N-oxypyridyl-2,7-bicyclo[3.2.0$^{1,5}$]hept-3-enes are useful in a wide variety of applications. For example the presence of the N-oxide groups renders the compositions useful as monomers which, when polymerized through the unsaturated group of the furan ring, are useful as thickening and coagulating agents. The compositions of this invention are also useful as organic intermediates for the preparation of a wide variety of compounds. For example, in the presence of acids, the novel compositions of this invention can be cleaved across the oxetane ring to form olefins. Moreover, these novel compositions, as are the known cyclic ethers, are useful as plasticizers. Additionally, the oxetanohydrofurans can homopolymerize or copolymerize with other reactive cyclic monomers to provide a useful class of polymeric compounds. These polymers can range from various liquids to tough solids. The viscous liquids of relatively low molecular weight, are useful in the preparation of polishes and waxes and as thickening agents for various lubricants. The polymers can also be employed as protective coatings and are useful for the production of various shaped articles such as brush handles, buttons, and the like. Moreover, since many of the compositions of this invention contain desirable functional groups, they are particularly useful in those areas where it is desirable to build such groups into the polymeric network.

Illustrative cyclic monomers which can polymerize with the oxetanohydrofurans of this invention include, among others, the epoxides, such as 4-vinylcyclohexene dioxide, 3,4-epoxycyclohexyl, 3,4-epoxycyclohexylcarboxylate, bis-(2,3-epoxycyclopentyl)-ether, and the like. Polymerization can be effected in the presence of known epoxide polymerization catalysts according to accepted techniques.

The 6 - N-oxypyridyl-2,7-dioxabicyclo[3.2.0$^{1,5}$]heptanes are also useful as insecticides. For example, syn-6-phenyl-anti - 6-N-oxy-γ-pyridyl-2,7-dioxabicyclo[3.2.0$^{1,5}$]heptane is effective as housefly bait.

Although the invention has been illustrated by the preceding examples, it is not to be construed as being limited to the materials employed therein, but rather, the invention encompasses the generic area as hereinbefore disclosed. Various modifications and embodiments of the invention can be made without departing from the spirit and scope thereof.

What is claimed is:
1. Oxetanohydrofurans selected from the class consisting of oxetanodihydrofurans and oxetanotetrahydrofurans of the respective formulae:

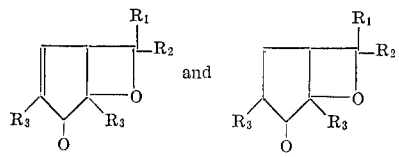

wherein $R_1$ contains up to 12 carbon atoms and is selected from the class consisting of hydrogen, lower alkyl, phenyl pyridyl, lower alkylpyridyl, N-lower alkylpyridyl, N-benzylpyridyl, and N-oxypyridyl; $R_2$ contains up to 12 carbon atoms and is selected from the class consisting of pyridyl, lower alkylpyridyl, N-lower alkylpyridyl, N-benzylpyridyl and N-oxypyridyl; and $R_3$ is selected from the group consisting of hydrogen or lower alkyl.

2. The oxetanodihydrofurans of claim 1 wherein $R_1$ and $R_3$ are hydrogen, and $R_2$ is pyridyl.

3. The oxetanodihydrofurans of claim 1 wherein $R_1$ is lower alkyl, $R_2$ is pyridyl and $R_3$ is hydrogen.

4. The oxetanodihydrofurans of claim 1 wherein $R_1$ is phenyl, $R_2$ is pyridyl and $R_3$ is hydrogen.

5. The oxetanodihydrofurans of claim 1 wherein $R_1$ and $R_3$ are hydrogen and $R_2$ is γ-pyridyl.

6. The oxetanodihydrofurans of claim 1 wherein $R_1$ is methyl, $R_2$ is γ-pyridyl and $R_3$ is hydrogen.

---
[1] 2,4-dinitro-6-(2-octyl)phenyl crotonate.

7. The oxetanodihydrofurans of claim 1 wherein $R_1$ is phenyl, $R_2$ is γ-pyridyl and $R_3$ is hydrogen.

8. The oxetanodihydrofurans of claim 1 wherein $R_1$ is methyl, $R_2$ is N-oxypyridyl, and $R_3$ is hydrogen.

9. The oxetanodihydrofurans of claim 1 wherein $R_1$ is phenyl, $R_2$ is N-oxypyridyl, and $R_3$ is hydrogen.

10. The oxetanotetrahydrofurans of claim 1 wherein $R_1$ is alkyl, $R_2$ is pyridyl and $R_3$ is hydrogen.

11. The oxetanotetrahydrofurans of claim 1 wherein $R_1$ is phenyl, $R_2$ is pyridyl, and $R_3$ is hydrogen.

12. Syn - 6 - methyl-anti-6-γ-pyridyl-2,7-dioxabicyclo-[3.2.0$^{1,5}$]hept-3-ene.

References Cited

Gagnaire et al., Chem Abstracts I, vol. 60, par. 13120a, 1964.

Toki et al., Chem. Abstracts II, vol. 63, par. 5616A–b, 1965.

Shima et al., Chem. Abstracts III, vol. 65, par. 15358g–15359a, November 1966.

ALAN L. ROTMAN, Primary Examiner

U.S. Cl. X.R.

260—294.9, 295, 296, 333; 424—263, 266; 71—94, 88